June 10, 1947.  J. N. WOLFRAM  2,422,158
FLEXIBLE COUPLING
Filed Nov. 21, 1944  2 Sheets-Sheet 1

Inventor
John N. Wolfram
By Mason, Porter T Diller
Attorneys

June 10, 1947.  J. N. WOLFRAM  2,422,158
FLEXIBLE COUPLING
Filed Nov. 21, 1944  2 Sheets-Sheet 2

Inventor
John N. Wolfram
By Mason, Porter & Diller
Attorneys

Patented June 10, 1947

2,422,158

UNITED STATES PATENT OFFICE 2,422,158

FLEXIBLE COUPLING

John N. Wolfram, Cleveland, Ohio, assignor to The Parker Appliance Company, Cleveland, Ohio, a corporation of Ohio Application November 21, 1944, Serial No. 564,460

2 Claims. (Cl. 285—90)

The present invention relates to new and useful improvements in tube couplings, and more particularly to improvements in couplings for flexibly clamping and sealing the ends of metal tubes.

An important object of the invention is to provide a flexible coupling for a tube or the like including threadedly engaged body and nut members defining therebetween an annular chamber for a pair of deformable packing members separated by a metal sleeve or washer-like member.

A further object of the invention is to provide a flexible tube coupling of the above type wherein one of the deformable packing members is subjected to a radial squeeze to establish a seal between one of the coupling members and the tube when the coupling is tightened, and the other packing member is deformed to resiliently support the tube and form a seal between the tube and the other coupling member.

A still further object of the invention is to provide a flexible coupling of the above type wherein the metal sleeve separating the packing members is located within the coupling at approximately the pivot center of the tube when flexed.

The above and other objects of the invention will in part be obvious and will be hereinafter more fully pointed out.

Figure 1:
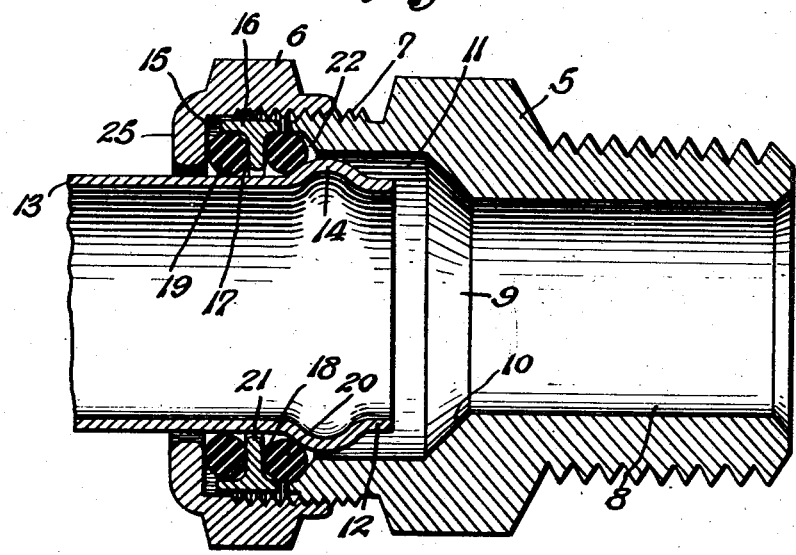
Figure 1 is a longitudinal view in section, illustrating the coupling with the tube inserted therein with the coupling members in finger tight engagement.
Figure 2:
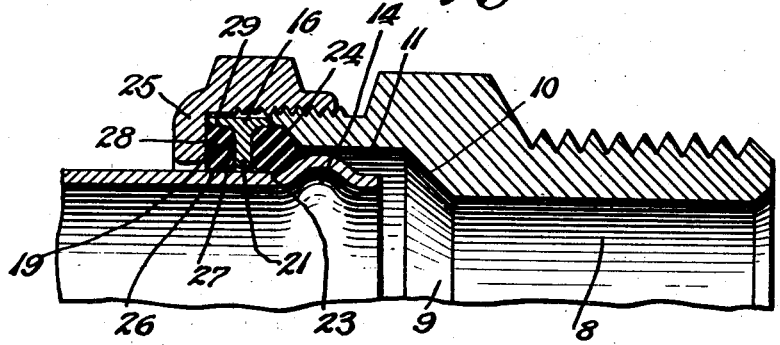
Figure 2 is a similar view in section illustrating the coupling after the coupling members have been tightened relative to one another.

Referring more in detail to the accompanying drawing, and particularly to Figures 1 and 2 thereof, the coupling includes a body member 5 and a nut member 6 which threadedly engage one another, as at 7. The body member 5 is provided with a central bore 8, and an annular recess 9, the inner wall portion of which is tapered as indicated at 10. The body member 5 is further formed with a counterbore 11 communicating with the annular recess 9 and adapted to receive the inner end 12 of the tube 13 being coupled. This type of tube is usually provided with an enlarged inner end and in the present embodiment of the invention said inner end is formed with an annular bead 14, the diameter of which is slightly smaller than the diameter of the counterbore 11.

The body member 5 and nut 6, when initially assembled in the position shown in Figure 1 of the drawing, define an annular chamber 15 in which is positioned a metal sleeve 16. This sleeve member 16 has a cylindrical contour and is counterbored from each end to provide recesses 17 and 18 for housing a pair of O packing members or rings 19 and 20 respectively. The counterboring of each end of the sleeve 16 forms a substantially centrally disposed rib 21, the inner periphery of which is slightly spaced from the tube 13. In other words, the sleeve 16 is substantially T-shaped in cross section as is clearly illustrated in the drawing.

The O rings 19 and 20 are readily deformable, being constructed of rubber or similar material, and it will be noted that the ring 20 is confined between the rib 21 and a second counterbore 22 formed in the end of the body member 5. The counterbore 22 is slightly less than the outside diameter of the ring 20 so that when the coupling is tightened, a radial squeeze will be applied on said ring to establish a seal between the tube and the body member adjacent the beaded portion 14 of the former. The other ring 19 will also be deformed upon tightening the nut 6 to resiliently support the tube and form a seal between said tube and nut.

The position of the tube 13 and the coupling members before the coupling members are tightened relative to one another is shown in Figure 1, and it will be seen that each end of the sleeve 16 is slightly spaced from the body member 5 and nut 6. However, the rings 19 and 20 are firmly held in their respective recesses. When the coupling members are tightened relative to one another, the metal sleeve 16 will be urged into contact with the end of the body member 5, effecting a radial squeeze on the O ring 20, deforming it to the shape shown in Figure 2 to establish a seal between the tube and body member at 23 and 24. Contact of the inner end 25 of the nut 6 with the O ring 19, as the nut is tightened, will deform said ring to the shape shown in Figure 2, whereby to resiliently support the tube and form a seal along the surfaces 26, 27, 28 and 29. The extent to which the nut 6 can be tightened is limited by contact of the inner end 25 with the sleeve. When the coupling members are finally tightened, the parts will assume the positions shown in Figure 2.

The new and improved coupling is designed so that the tube 13 substantially floats in rubber with no metal to metal contact thereof with the coupling parts. Provision of the rib 21, which closely surrounds the tube substantially prevents the pinching of the O packing rings therebetween. This rib 21 is designed so as to be located at approximately the pivot center of the tube when the tube is flexed and also helps to prevent pull out strains. Should the tube 13 be subjected to severe pull out strains, the beaded portion 14 thereof would engage the rib 21 and positively prevent displacement of the tube from the coupling.

Figure 3:
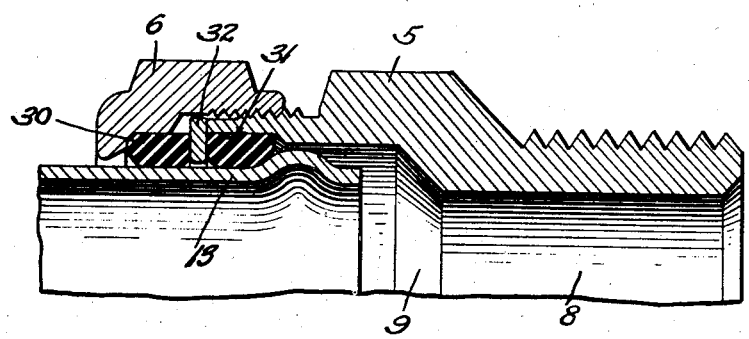
Figure 3 is a longitudinal sectional view of a modified form of the invention, the coupling members being held in finger tight engagement.
Figure 4:
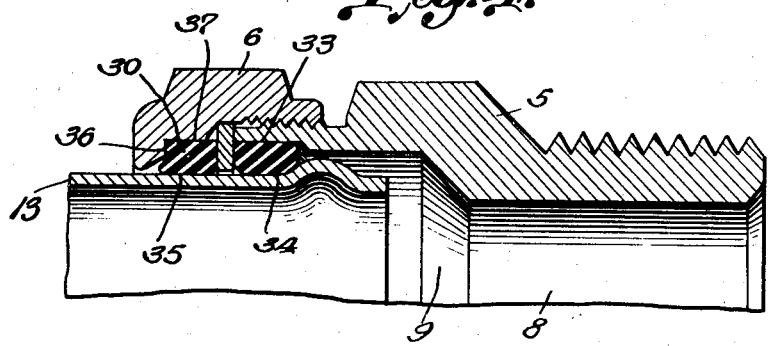
Figure 4 is a similar view in section illustrating the modified form of coupling after the coupling members have been tightened relative to one another.

The modified form of the coupling shown in Figures 3 and 4 is substantially the same as the preferred form except that elongated packing members 30 and 31, formed of rubber or similar material, are employed in place of the O rings. In this form of the invention the sleeve member 16 has been replaced with a metallic washer-like member 32. The innermost packing member 31 is radially squeezed at 33 and 34 when the nut 6 is tightened relative to the body member 5 to establish a seal between the tube and body member. The outermost packing member 30 is also subjected to a radial squeeze to establish a seal at 35, 36, and 37 between the tube and nut, and to also resiliently support the tube within the coupling.

It is to be clearly understood that various changes in the details and construction and arrangement of parts may be made without departing from the scope of the invention as set forth in the appended claims.

I claim:

1. A flexible coupling for a tube having an enlarged end comprising a body member to which said tube is to be connected, and a nut having a threaded engagement with said body member, the end of said body member and the nut being shaped so as to provide an annular chamber, a sleeve disposed in said chamber and surrounding said tube, said sleeve being adapted to engage the end of the body member when the coupling is closed, said sleeve having an inwardly projecting annular rib formed integral therewith and disposed intermediate the ends thereof and having an opening therethrough of greater diameter than the diameter of the tube but of less diameter than the enlarged end of the tube, a deformable gasket disposed within the sleeve at one side of said rib and between said rib and the inner end of the body member, and adapted when the coupling is closed to make sealing engagement with the tube and the body member, a deformable gasket disposed within said sleeve on the opposite side of said rib and adapted to be contacted with by the nut when the coupling is closed, whereby said last-named gasket is forced into contact with the tube and thereby establish a second seal for the tube and a resilient support for the tube within the coupling.

2. A flexible coupling for a tube having an enlarged end comprising a body member to which said tube is to be connected, and a nut having a threaded engagement with said body member, the end of said body member and the nut being shaped so as to provide an annular chamber, a sleeve disposed in said chamber and surrounding said tube, said sleeve being adapted to engage the end of the body member when the coupling is closed, said sleeve having an inwardly projecting annular rib formed integral therewith and disposed intermediate the ends thereof and having an opening therethrough of greater diameter than the diameter of the tube but of less diameter than the enlarged end of the tube, a deformable gasket disposed within the sleeve at one side of said rib and between said rib and the inner end of the body member, and adapted when the coupling is closed to make sealing engagement with the tube and the body member, a deformable gasket disposed within said sleeve on the opposite side of said rib and adapted to be contacted with by the nut when the coupling is closed, whereby said last-named gasket is forced into contact with the tube and thereby establish a second seal for the tube and a resilient support for the tube within the coupling, said sleeve and nut being dimensioned so that the nut will contact with the end of the sleeve and the sleeve make contact with the end of the body member and thus prevent over-tightening of the coupling.

JOHN N. WOLFRAM.

REFERENCES CITED

The following references are of record in the file of this patent:

UNITED STATES PATENTS

| Number | Name | Date |
| --- | --- | --- |
| 2,300,584 | Martin | Nov. 3, 1942 |
| 2,318,428 | Skinner | May 4, 1943 |
| 2,301,280 | Howe | Nov. 10, 1942 |